(12) United States Patent
Manolescu et al.

(10) Patent No.: US 10,385,592 B2
(45) Date of Patent: Aug. 20, 2019

(54) LATCH INTERNAL MECHANISM

(71) Applicant: Ford Global Technologies, LLC, Dearborn, MI (US)

(72) Inventors: Constantin Manolescu, Rochester Hills, MI (US); Livianu Dorin Puscas, Rochester Hills, MI (US); Kosta Papanikolaou, Huntington Woods, MI (US); Thomas Michael Herline, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 517 days.

(21) Appl. No.: 15/236,981

(22) Filed: Aug. 15, 2016

(65) Prior Publication Data

US 2018/0044947 A1    Feb. 15, 2018

(51) Int. Cl.
 *E05B 77/06*   (2014.01)
 *E05B 79/22*   (2014.01)
 *F16H 21/44*   (2006.01)

(52) U.S. Cl.
 CPC .............. *E05B 77/06* (2013.01); *E05B 79/22* (2013.01); *F16H 21/44* (2013.01)

(58) Field of Classification Search
 CPC .......... E05B 77/02; E05B 77/04; E05B 77/06; E05B 79/22; Y10T 292/57; Y10T 292/1047; Y10T 292/108; Y10S 292/22; Y10S 292/23; Y10S 292/65; F16H 21/44
 See application file for complete search history.

(56) References Cited

U.S. PATENT DOCUMENTS

| | | |
|---|---|---|
| 3,990,531 A | 11/1976 | Register |
| 4,683,774 A | 8/1987 | Memmola |
| 5,037,145 A | 8/1991 | Wilkes |
| 5,123,687 A | 6/1992 | Pfeiffer et al. |
| 5,669,642 A | 9/1997 | Kang |
| 5,887,918 A | 3/1999 | Okada et al. |
| 5,927,895 A | 7/1999 | Watanabe |
| 6,007,122 A | 12/1999 | Linder et al. |
| 6,042,159 A | 3/2000 | Spitzley et al. |
| 6,241,294 B1 | 6/2001 | Young et al. |
| 6,264,257 B1 | 7/2001 | Meinke |

(Continued)

FOREIGN PATENT DOCUMENTS

| | | |
|---|---|---|
| DE | 19837662 A1 | 4/1999 |
| DE | 10002215 C1 | 10/2001 |

(Continued)

*Primary Examiner* — Alyson M Merlino
(74) *Attorney, Agent, or Firm* — Vichit Chea; Price Heneveld LLP

(57) ABSTRACT

A door for vehicles includes a mechanism that prevents unlatching of the door if the door handle is moved at a high rate of speed, but permits unlatching during normal (e.g. manual) handle operation. The mechanism includes a wheel having a wheel tooth. The door mechanism also includes an inertia lever having a first pair of teeth. An input lever has a second pair of teeth that engage the wheel tooth and the first pair of teeth. This engagement prevents rotation of the input lever only when the input lever rotates at a rate above a predefined maximum rate thereby rotating the inertia lever relative to the wheel. Rotation of the input lever unlatches a door latch.

17 Claims, 5 Drawing Sheets

(56) References Cited

U.S. PATENT DOCUMENTS

| | | |
|---|---|---|
| 6,712,409 B2 | 3/2004 | Monig |
| 6,971,688 B2 | 12/2005 | Drysdale et al. |
| 7,070,212 B2 | 7/2006 | Spurr |
| 7,097,212 B2 | 8/2006 | Willats et al. |
| 7,481,468 B2 | 1/2009 | Merideth et al. |
| 7,635,151 B2 | 12/2009 | Rodawold, Jr. et al. |
| 7,686,355 B2 | 3/2010 | Jankowski et al. |
| 7,810,852 B2 | 10/2010 | Alacqua et al. |
| 8,029,032 B1 | 10/2011 | Yang |
| 8,152,209 B2 | 4/2012 | Lee |
| 8,303,004 B2 | 11/2012 | Lee et al. |
| 8,322,077 B2 | 12/2012 | Papanikolaou et al. |
| 8,366,159 B2 | 2/2013 | Patel |
| 8,616,611 B2 | 12/2013 | Schidan et al. |
| 8,701,817 B2 | 4/2014 | Schoen |
| 8,814,232 B2 | 8/2014 | Bertolotti |
| 8,899,640 B2 | 12/2014 | Bertolotti Potachin |
| 9,115,514 B2 | 8/2015 | Papanikolaou et al. |
| 9,605,450 B2 | 3/2017 | Puscas et al. |
| 2005/0184537 A1 | 8/2005 | Le et al. |
| 2005/0280266 A1* | 12/2005 | Mueller ............ E05B 77/06 292/336.3 |
| 2007/0120382 A1 | 5/2007 | Chevalier |
| 2007/0271974 A1* | 11/2007 | Jankowski ......... E05B 77/06 70/237 |
| 2009/0223263 A1 | 9/2009 | Puscas et al. |
| 2010/0301618 A1 | 12/2010 | Costigan et al. |
| 2010/0320777 A1* | 12/2010 | Jankowski ......... E05B 77/06 292/200 |
| 2013/0056999 A1 | 3/2013 | Beck |
| 2013/0229022 A1 | 9/2013 | Leseur |
| 2013/0233034 A1 | 9/2013 | Ono et al. |
| 2013/0313036 A1* | 11/2013 | Kovie ............... E05B 77/06 180/274 |
| 2014/0015263 A1 | 1/2014 | Da Deppo et al. |
| 2014/0097624 A1 | 4/2014 | Papanikolaou et al. |
| 2014/0132008 A1 | 5/2014 | Bendel et al. |
| 2014/0145454 A1 | 5/2014 | Da Deppo et al. |
| 2014/0367977 A1 | 12/2014 | Beck et al. |
| 2015/0159408 A1 | 6/2015 | Hunt et al. |
| 2015/0240537 A1 | 8/2015 | Cumbo |
| 2015/0337566 A1 | 11/2015 | Wittelsbuerger et al. |
| 2015/0345188 A1 | 12/2015 | Puscas et al. |
| 2016/0097223 A1 | 4/2016 | Rosales et al. |
| 2016/0160540 A1* | 6/2016 | Bejune ............... E05B 77/06 292/196 |
| 2016/0290015 A1 | 10/2016 | Puscas et al. |
| 2017/0074004 A1* | 3/2017 | Mittelbach ......... E05B 77/06 |
| 2017/0159329 A1 | 6/2017 | Puscas et al. |
| 2018/0044947 A1 | 2/2018 | Manolescu et al. |

FOREIGN PATENT DOCUMENTS

| | | | |
|---|---|---|---|
| DE | 202006011206 U1 | 11/2007 | |
| DE | 102009038612 A1 | 3/2011 | |
| DE | 202010014992 U1 | 1/2012 | |
| DE | 202013103708 U1 | 11/2014 | |
| DE | 102013021521 A1 | 6/2015 | |
| DE | 102014002168 A1 * | 8/2015 | ............ E05B 77/06 |
| JP | 2011099238 A | 5/2011 | |
| WO | 2013093092 A1 | 6/2013 | |
| WO | 2014188909 A1 | 11/2014 | |

* cited by examiner

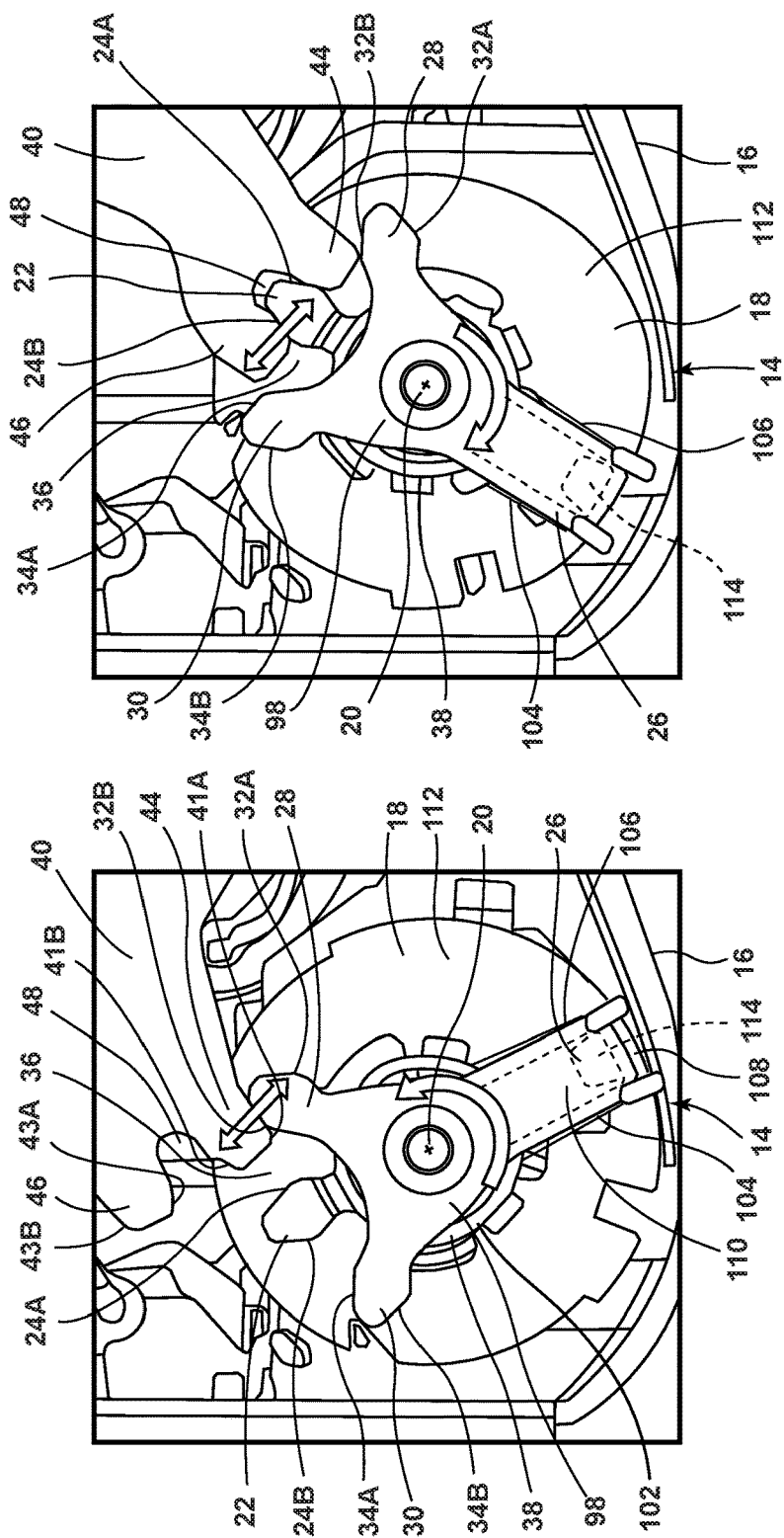

LATCH INTERNAL MECHANISM

FIELD OF THE INVENTION

The present disclosure generally relates to vehicle door latches, and in particular to a device that prevents unlatching of a vehicle door if the door handle is pulled outwardly at a high speed.

BACKGROUND OF THE INVENTION

Vehicle doors typically include a latch mechanism that retains the door in a closed position when the latch mechanism is latched. Latch mechanisms typically include a latch member such as a rotatable "claw" that engages a striker on the vehicle body to retain the door in a closed position. When the latch mechanism is latched, a pawl selectively engages the claw to retain the claw in an engaged position such that the claw cannot disengage from the striker. The pawl can be shifted to a released position, thereby permitting rotation of the claw whereby the claw disengages from the striker as the vehicle door is opened.

The pawl may be mechanically connected to an outside door handle by a cable or other mechanical linkage. During normal operation, a user grasps the exterior door handle to move it outwardly, and the linkage causes the pawl to move from a retaining (latched) position to a released position. The user then pulls the door open, causing the claw to rotate and disengage from the striker. The door may also include a lock mechanism that selectively disengages the linkage that otherwise interconnects the exterior door handle and the pawl of the latch mechanism. If the door is locked, the linkage is no longer mechanically connected, such that rotation of the exterior door handle does not shift the pawl to the released position.

If a vehicle experiences a side impact, the transverse acceleration may cause the door handle to rotate outwardly, resulting in the door unlatching. Door handles may be designed with counter weights to reduce or eliminate the tendency for the door handle to move outwardly in the event of a side impact. However, designing counter weights for various handle designs may increase the cost and complexity of the handle design.

SUMMARY OF THE INVENTION

One aspect of the present disclosure is a latch system for vehicle doors including a support and a first member that is rotatably connected to the support for rotation about a first axis relative to the support. The first member includes at least one tooth having opposite sides. The latch system further includes an intermediate member that is rotatably connected to the support for rotation about the first axis relative to the support. The intermediate member or inertia lever includes spaced apart first and second teeth having a first gap therebetween. The latch system further includes a torsion spring operably interconnecting the first member and the intermediate member such that force is transmitted from the intermediate member to the first member through the spring. The first member has sufficient mass movement of inertia to deform the torsion spring and permit rotation of the intermediate member relative to the first member through a first range of motion if the intermediate member is rotated at an angular rate that exceeds a predefined maximum allowable angular rate. The latch system further includes an input lever that is rotatably connected to the support for rotation about a second axis that is spaced apart from the first axis. The input lever includes spaced apart first and second teeth forming a second gap therebetween. A movable handle is operably connected to the input lever by first linkage. Movement of the handle moves the input lever. A latch mechanism includes a movable pawl that is operably connected to the input lever such that movement of the input lever shifts the pawl from a retaining position to a released position to unlatch the latch mechanism. Movement of the handle at a first speed causes rotation of the input lever at a first angular rate that is below the predefined maximum allowable angular rate causes the first tooth of the input lever to engage the first tooth of the intermediate member and rotate the intermediate member and the first member to thereby unlatch the latch mechanism. Movement of the handle at a second speed causes rotation of the input lever at a second angular rate that is above the predefined maximum allowable angular rate and causes the first tooth of the input lever to engage the first tooth of the intermediate member and rotate the intermediate member relative to the first member such that the second tooth of the input lever and the second tooth of intermediate member engage opposite sides of the tooth of the first member while the first tooth of the input lever simultaneously engages the first tooth of the intermediate member, thereby preventing rotation of the input lever such that the latch mechanism does not unlatch.

Another aspect of the present disclosure is a door for vehicles including a wheel having a wheel tooth. The door also includes an inertia lever having a first pair of teeth. An input lever has a second pair of teeth that engage the wheel tooth and the first pair of teeth. This engagement prevents rotation of the input lever only when the input lever rotates at a rate above a maximum rate thereby rotating the inertia lever relative to the wheel. Rotation of the input lever unlatches a door latch.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a partially fragmentary view showing a mechanism that prevents unlatching if a door handle is moved outwardly at a high rate of speed, wherein the mechanism is in an initial or rest state;

FIG. 5 is a partially fragmentary view of the mechanism of FIG. 4, showing the mechanism during normal handle operation when the door handle is pulled outwardly to an intermediate position by a user;

DETAILED DESCRIPTION OF THE PREFERRED EMBODIMENTS

Figure 1:
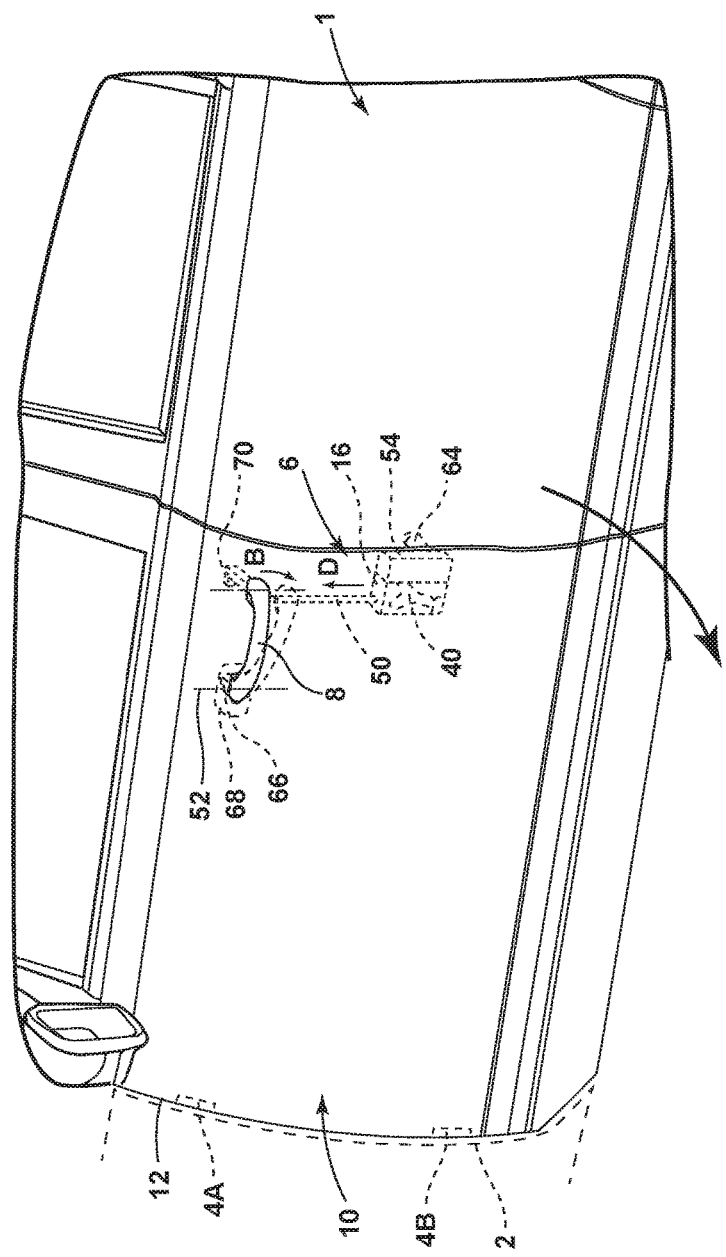
FIG. 1 is a partially fragmentary isometric view of a vehicle door including a handle and latch mechanism.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes a body structure 2 and at least one door 10 that is movably mounted to the body structure 2 by hinges 4A and 4B that are located adjacent a front portion 12 of door 10. A latch system 6 for the door 10 includes a support such as a housing 16 (see also FIGS. 2 and 3), and a first member such as a wheel 18 (see also FIGS. 4-7) that is rotatably connected to the housing 16 for rotation about a first axis 20 relative to housing 16. The wheel 18 includes a tooth 22 having first and second opposite sides 24A and 24B. The latch system 6 also includes an intermediate member such as inertia lever 26 that is rotatably connected to the housing 16 for rotation about the first axis 20 relative to the housing 16. The inertia lever 26 includes spaced apart first and second teeth 28 and 30, respectively. A first gap 36 is formed between the first and second teeth 28 and 30 of inertia lever 26. A resilient member such as torsion spring 38 operably interconnects the wheel 18 and inertia lever 26 such that force is transmitted from the inertia lever 26 to the wheel 18 through the torsion spring 38. The wheel 18 has sufficient mass moment of inertia to cause deformation of the torsion spring 38 and permit rotation of the inertia lever 26 relative to the wheel 18 through a first range of motion (i.e. the difference in positions shown in FIGS. 4 and 7) if the inertia lever 26 is rotated at an angular rate that exceeds a predefined maximum allowable angular rate. An input lever 40 (FIG. 2) is rotatably connected to the housing 16 for rotation about a second axis 42 that is spaced apart from the first axis 20. The input lever 40 includes first and second teeth 44 and 46 (FIGS. 4-7) that form a second gap 48 therebetween. A movable handle 8 (FIG. 1) is operably connected to the input lever 40 by linkage such as cable 50 or other suitable linkage, such that movement of the handle 8 about axis 52 as shown by the arrow "B" (FIG. 1) moves the input lever 40.

Figure 2:
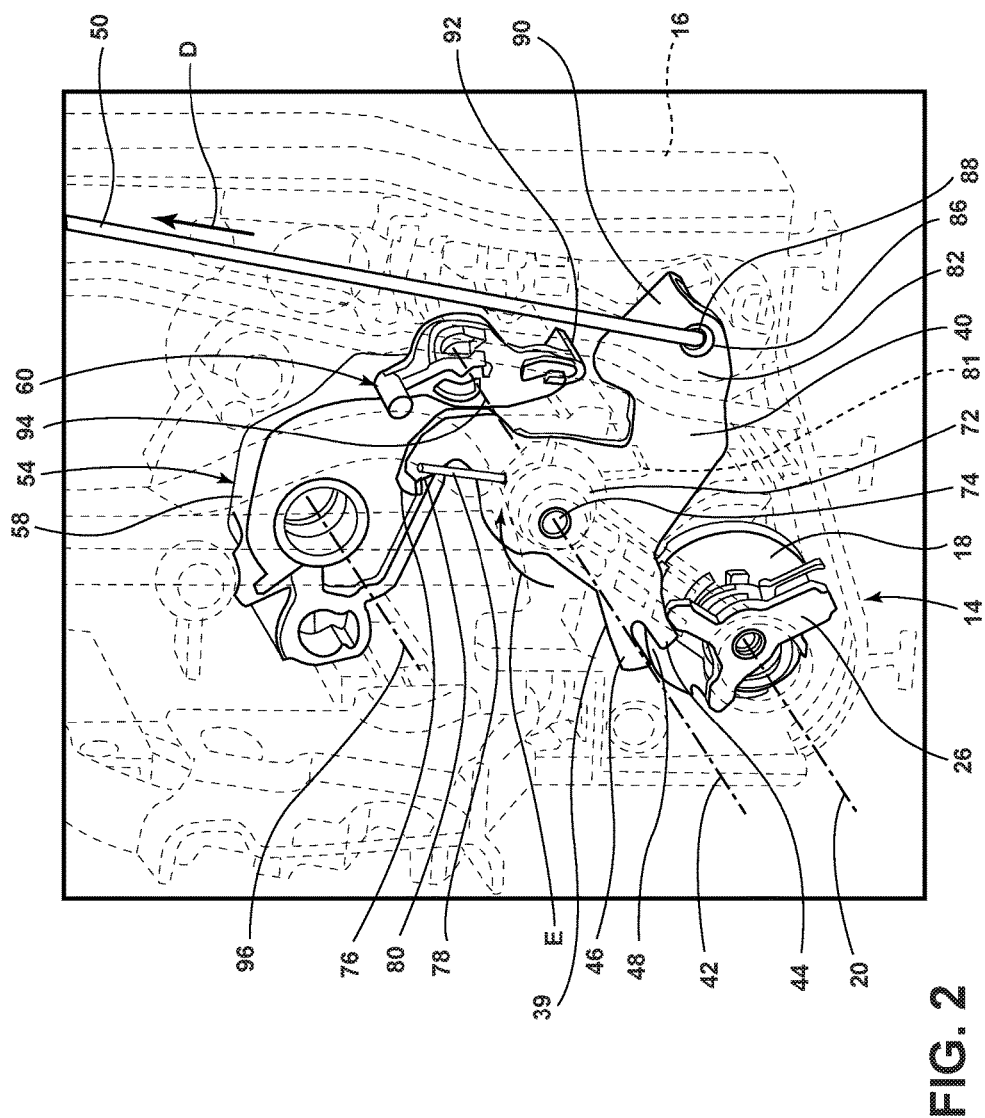
FIG. 2 is a partially fragmentary isometric view of a latch mechanism.
Figure 3:
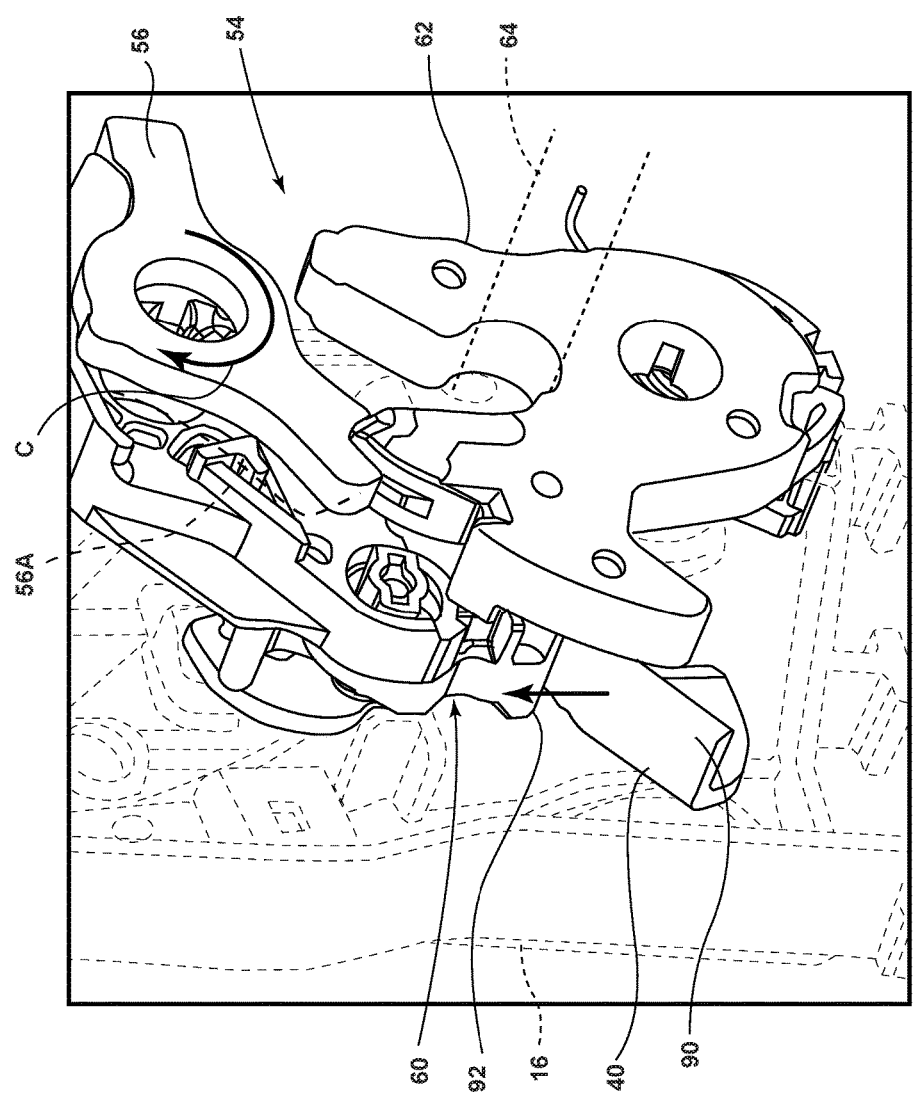
FIG. 3 is a partially fragmentary isometric view of the latch mechanism of FIG. 2.

With reference to FIGS. 2 and 3, a latch mechanism 54 includes a movable pawl 56 that is operably connected to the lever 40 by a link 58 and lock member 60, such that movement of the input lever 40 shifts (e.g. rotates) pawl 56 as shown by the arrow "C" (FIG. 3) from the retaining position shown in FIG. 3 to a released position shown by the dashed line 56A to unlatch the latch mechanism 54 and permit rotational movement of claw 62 whereby the claw 62 disengages from a striker 64 secured to body structure 2. The pawl 56, claw 62, striker 64, link 58, and lock member 60 may comprise conventional latch components of a type that are well known in the art.

Movement of the handle 8 at a first speed (e.g. if the handle 8 is pulled outwardly by a user) causes rotation of the input lever 40 at a first angular rate (that is below the predefined maximum allowable angular rate) causes the first tooth 44 of the input lever 40 to engage the first tooth 28 of the inertia lever 26 and rotate the inertia lever 26 from the position shown in FIG. 4 to the position shown in FIG. 5 and/or the position shown in FIG. 6, such that rotation of the input lever 40 shifts the pawl 56 to a released position to thereby permit rotation of claw 62. When the pawl 56 is in the retaining or latched position shown in FIG. 3 the latch mechanism 54 is in a latched state because the claw 62 cannot rotate. However, when the pawl 56 is rotated to the released position 56A, the claw 62 can rotate and the latch mechanism 54 is therefore unlatched.

Movement of the handle 8 at a second speed (e.g. high speed) causes rotation of the input lever 40 at a second angular rate that is above the predefined maximum allowable angular rate. This causes the first tooth 44 of input lever 40 to engage the first tooth 28 of inertia lever 26, and rotates the inertia lever 26 relative to the wheel 18 as shown in FIG. 7, such that the second tooth 46 of input lever 40 and the second tooth 30 of the inertia lever 26 engage the opposite sides 24A and 24B of the tooth 22 of wheel 18. This engagement prevents rotation of the input lever 40 such that the latch mechanism 54 does not (cannot) unlatch.

Referring again to FIG. 1, handle 8 may comprise a strap type handle having a pivot structure 66 that rotatably interconnects handle 8 to a door pivot structure 68 for rotation about a vertical axis 52 in a known manner. Handle 8 may also include a hook 70, bell crank (not shown), and/or other components to operably interconnect handle 8 to linkage 50 in a known manner, whereby outward rotation of handle 8 shifts cable 50 upwardly as shown by the arrow "D" to unlatch latch mechanism 54 (if the handle 8 is moved outwardly at a slower speed). Handle 8 may, alternatively, comprise a paddle type handle (not shown) that pivots outwardly about a horizontal axis to shift the cable/linkage 50 to unlatch the latch mechanism 54. It will be understood that virtually any type of movable door handle may be utilized in connection with the speed based device 14.

Referring again to FIG. 2, the input lever 40 includes a central portion 72 including a pivot 74 to rotatably interconnect the input lever 40 to the housing 16. Pivot 74 may comprise a pin, bushings, or other suitable known rotatable connector. Input lever 40 includes a first portion such as arm 39 extending from central portion 72. Teeth 44 and 46 may be formed at the end of arm 39. Input lever 40 may also include a first arm 76 that engages a first leg 80 of a second torsion spring 78. A second leg 81 of second torsion spring 78 engages housing 16. Second torsion spring 78 biases input lever 40 in a clockwise direction about axis 42 (pivot 74) as shown by the arrow "E." A second arm 82 of input lever 40 includes a connector such as an opening 86 that connects to an end 88 of linkage/cable 50. Upward movement of cable 50 in the direction of the arrow D due to rotation of handle 8 causes input lever 40 to rotate in a counterclockwise direction (opposite arrow E) about second axis 42. An end surface 90 of input lever 40 is configured to engage a surface 92 of lock member 60. Lock member 60 is pivotably interconnected to link 58 for rotation about an axis 94. When the lock member 60 is in the unlocked position of FIG. 2, rotation of input lever 40 causes surface 90 of input lever 40 to contact surface 92 of lock member 60, thereby rotating link 58 about an axis 96. Rotation of link 58 rotates pawl 56 to thereby unlatch the latch mechanism 54. Link 58 may be directly connected to pawl 56 such that link 58 and pawl 56 rotate at the same rate. The link 60 may be rotated to a locked position (e.g. 30°, 60°, or 90° relative to the position shown in FIG. 2) if the door 10 is locked. When lock member 60 is in the locked position, the surface 92 is shifted away from surface 90 such that rotation of input lever 40 does not cause surface 90 to contact surface 92, and the link 58 does not rotate such that the pawl 56 does not rotate, and the latch therefore remains in a latched state. The lock member 60 may be operably connected to a powered actuator (not shown) and/or an unlock lever or button (not shown) to shift the lock member 60 between locked and unlocked positions. The pawl 56, link 58, lock member 60, and claw 62 may be substantially similar to known designs, such that additional details concerning these components are not believed to be required.

Referring again to FIGS. 4-7, inertia lever 26 includes a central portion 98 having a pivot 100 that rotatably interconnects inertia lever 26 to housing 16. The pivot 100 may comprise a pin and bushings or other suitable connector. The pivot 100 also rotatably interconnects the wheel 18 to housing 16 for rotation about first axis 20. As discussed above, torsion spring 38 interconnects wheel 18 and inertia lever 26. Torsion spring 38 includes one or more coils 102 that extend around pivot 100, and first and second legs 104 and 106 (FIG. 7) that extend outwardly away from the axis 20. Wheel 18 is generally cylindrical in shape, with oppositely-facing opposite side surfaces 112 and 112A, and a peripheral edge surface 113 extending between the opposite surfaces 112 and 112A. An arm 110 of inertia member 26 includes a tab 108 that extends towards side surface 112 of wheel 18. The first and second legs 104 and 106 of torsion spring 38 are disposed on opposite sides of tab 108. Wheel 18 includes a protrusion or extension 114 that projects away from surface 112 towards arm 110 of inertia lever 26. The extension 114 (FIG. 7) is disposed between the first and second legs 104 and 106 of torsion spring 38. Because tab 108 of inertia member 26 and extension 114 of wheel 18 are both disposed between legs 104 and 106 of torsion spring 38, if the inertia lever 26 rotates relative to the wheel 18 as shown by the arrow "R" (FIG. 7), the torsion spring 38 generates a force tending to return the inertia lever 26 to a rest or home position relative to wheel 18 as shown in FIG. 4.

Referring again to FIG. 4, opposite sides 32A and 32B of tooth 28 of inertia lever 26 are preferably involute surfaces. Similarly, opposite side surfaces 34A and 34B of second tooth 30 of inertia lever 26 are also preferably involute surfaces. Similarly, the opposite side surfaces 24A and 24B of tooth 22 of wheel 18 are also preferably involute, as are the surfaces 41A and 41B of first tooth 44 of input lever 40 and surfaces 43A and 43B of second tooth 46 of input lever 40. The involute gear surfaces are configured to avoid "slicing," and to reduce noise and wear.

Referring again to FIG. 4, when the door handle 8 is in a retracted or home position (i.e. a user has not pulled handle 8 outwardly), the inertia lever 26 is at a centered or home position relative to the wheel 18. As also shown in FIG. 4, the surface 41A of first tooth 44 of input lever 40 is initially positioned directly adjacent side surface 32A of first tooth 28 of inertia lever 26. In FIG. 4, the surfaces 41A and 32B are shown in contact with one another. However, it will be understood that in the home or rest position surfaces 41A and 32B may (optionally) be spaced apart slightly to form a gap to thereby form a lost motion connection such that initial rotation of input lever 40 does not cause rotation of inertia lever 26 until the gap is taken up due to rotation of input lever 40.

If a user pulls outwardly on the door handle 8 when the speed based mechanism 14 is in the configuration of FIG. 4, rotation of input lever 40 causes rotation of inertia lever 26. Rotation of inertia lever 26 causes rotation of wheel 18 due to torsion spring 38. As the input lever 40 is rotated, the speed based mechanism 14 shifts to the configuration shown in FIG. 5. In FIG. 5, the tooth 22 of wheel 18 is disposed between the first and second teeth 44 and 46, respectively, of input lever 40. Further rotation of handle 8 may further rotate the input lever 40 to the position shown in FIG. 6, in which only the second tooth 46 of input lever 40 is in engagement with tooth 22 of wheel 18. When the input lever 40 rotates the position of FIG. 5 (or the position of FIG. 6), the rotation of input lever 40 rotates the pawl 56 to a released position whereby the latch mechanism 54 is unlatched and the claw 62 can rotate to disengage striker 64 (FIG. 3).

Figures 6, 7:
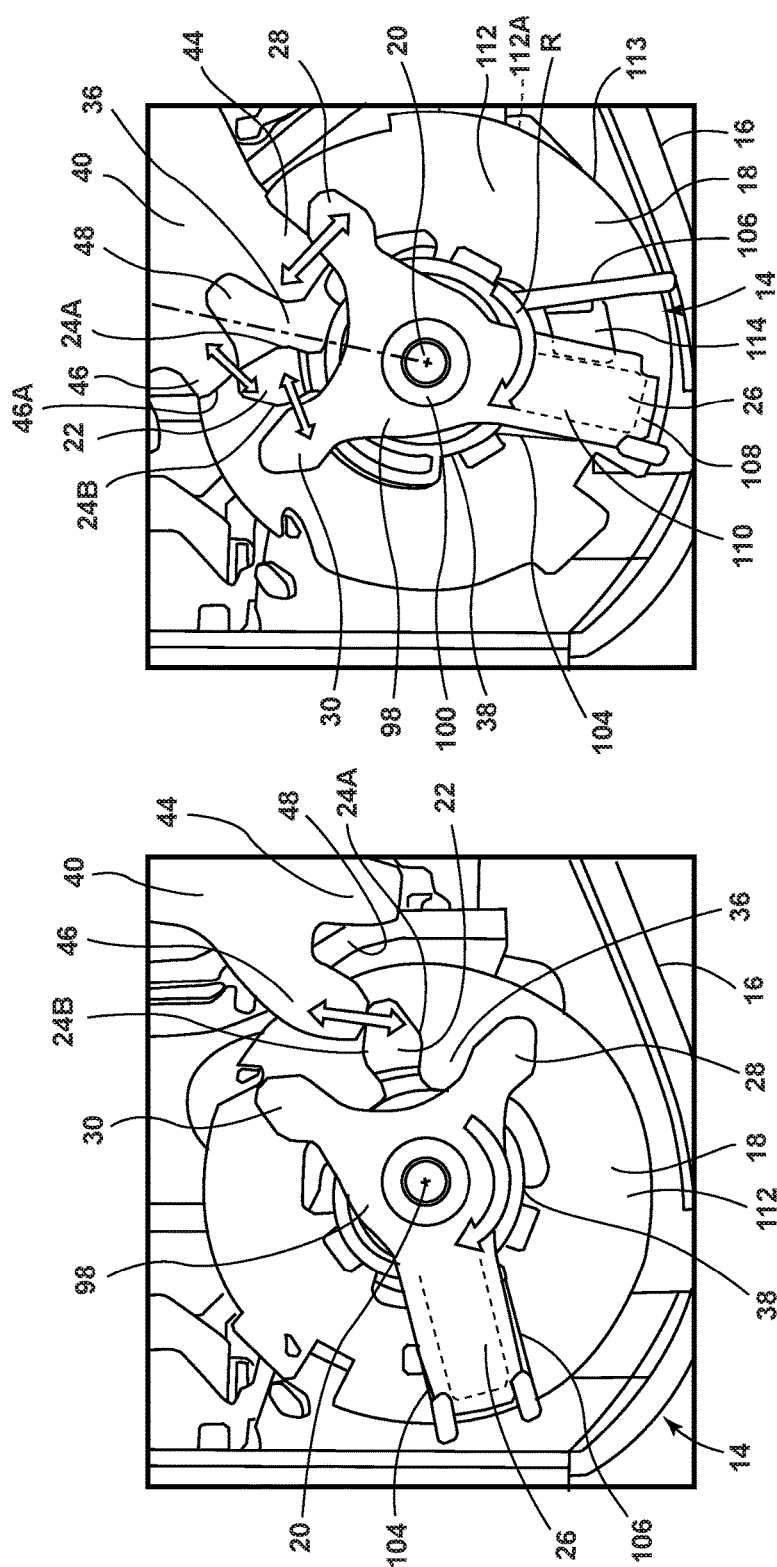
FIG. 6 is a partially fragmentary view showing the mechanism of FIG. 5, wherein the handle has been pulled to a fully open position during normal handle operation.
FIG. 7 is a partially fragmentary view showing the mechanism of FIG. 4 wherein the door handle has been moved outwardly at a high rate of speed, and wherein the mechanism prevents unlatching due to high handle speed.

However, if handle 8 is moved outwardly at a high rate of speed, the speed-based mechanism 14 shifts to a locked configuration shown in FIG. 7. If handle 40 is rotated at a high rate of speed when the mechanism 14 is in the position of FIG. 4, the first tooth 44 of input lever 40 generates a force acting on first tooth 28 of inertia lever 26, causing inertia lever 26 to rotate rapidly in the direction of the arrow R (FIG. 7). The wheel 18 has a significant mass moment of inertia, such that a relatively large force is required to rotationally accelerate wheel 18. The torsional force required to rotationally accelerate wheel 18 results in deflection of torsion spring 38 as shown in FIG. 7, whereby inertia lever 26 rotates relative to wheel 18. As inertia lever 26 rotates relative to wheel 18, the tooth 22 of wheel 18 shifts or moves towards second tooth 30 of inertia lever 26 and the tooth 22 contacts tooth 30 to prevent further rotation of inertia lever 26 relative to wheel 18. Also, as input lever 40 rotates, the planar end surface 46A of second tooth 46 of input lever 40 comes into contact with surface 24A of tooth 22 of wheel 18. The engagement of teeth 44 and 46 of input lever 40 with tooth 28 of inertia lever 26 and tooth 22 of wheel 18 prevents further rotation of input lever 40. Thus, when the speed-based mechanism 14 is in the locked configuration of FIG. 7, input lever 40 cannot rotate. Because the input lever 40 cannot rotate past the position shown in FIG. 7, the input lever 40 does not contact or move lock member 60, link 58, or pawl 56 (FIGS. 2 and 3). Thus, the mechanism 14 prevents unlatching if handle 8 is moved outwardly at a speed that is above a predefined maximum allowable rate. Referring to FIG. 2, surface 90 of input lever 40 may (optionally) be spaced-apart from surface 92 of lock member 60 when the handle 8 is in a home position to thereby form a lost motion interconnection between input lever 40 and lock member 60/link 58/pawl 56. This lost motion permits a small initial rotation of input lever 40 from the position of FIG. 4 to the locked position of FIG. 7 without shifting pawl 56 to a disengaged or released position.

The predefined maximum allowable speed may be defined in various ways. For example, the maximum allowable speed may be defined as an angular velocity of one or more components such as input lever 40. Alternatively, the speed may comprise a linear movement of cable 50. In general, the speed-based mechanism may be configured such that the maximum allowable linear speed of cable 50 is in a range of about 500 mm/sec and 900 mm/sec. The maximum allowable speed may be chosen such that the speed-based mechanism 14 shifts to the locked configuration (FIG. 7) if handle 8 is shifted outwardly at a speed that is equal to, or greater than, the maximum speed at which a human user is able to pull the handle 8 outwardly. This ensures that the speed-based mechanism 14 does not shift to the locked position (FIG. 7) to prevent unlatching during normal (manual) operation of handle 8 and vehicle door 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A latch system for vehicle doors, comprising:
a support;
a first member rotatably connected to the support for rotation about a first axis relative to the support, the first member including a tooth having opposite sides;
an intermediate member rotatably connected to the support for rotation about the first axis relative to the support having spaced apart first and second teeth forming a first gap therebetween;
a torsion spring operably interconnecting the first member and the intermediate member such that force is transmitted from the intermediate member to the first member through the torsion spring, and wherein the first member has a sufficient mass moment of inertia to deform the torsion spring and permit rotation of the intermediate member relative to the first member through a first range of motion when the intermediate member is rotated at an angular rate that exceeds a predefined maximum allowable angular rate;
an input lever rotatably connected to the support for rotation about a second axis that is spaced apart from the first axis, the input lever having spaced apart first and second teeth forming a second gap therebetween;
a movable handle operably connected to the input lever by a first linkage such that movement of the handle rotates the input lever;
a latch mechanism having a movable pawl that is operably connected to the input lever such that rotation of the input lever shifts the pawl from a retaining position to a released position to place the latch mechanism in an unlatched state;
wherein movement of the handle at a first speed causes rotation of the input lever at a first angular rate that is below the predefined maximum allowable angular rate so as to cause the first tooth of the input lever to engage the first tooth of the intermediate member and rotate the intermediate member at an angular rate that is below the predefined maximum allowable angular rate and the first member to thereby place the latch mechanism in the unlatched state;
movement of the handle at a second speed causes rotation of the input lever at a second angular rate that is above the predefined maximum allowable angular rate and causes the first tooth of the input lever to engage the first tooth of the intermediate member and rotate the intermediate member at the angular rate that exceeds the predefined maximum allowable angular rate, relative to the first member such that the second tooth of the input lever and the second tooth of the intermediate member engage the opposite sides of the tooth of the first member while the first tooth of the input lever simultaneously engages the first tooth of the intermediate member, thereby preventing rotation of the input lever such that the latch mechanism is not placed in the unlatched state.

2. The latch system of claim 1, wherein:
rotation of the input lever at the first angular rate that is below the predefined maximum allowable angular rate causes the second tooth of the input lever to engage the tooth of the first member such that rotation of the input lever rotates the first member.

3. The latch system of claim 2, wherein:
the second tooth of the input lever engages the tooth of the first member after the first tooth of the input lever engages the first tooth of the intermediate member and rotates the intermediate member through an initial angular range.

4. The latch system of claim 1, wherein:
the opposite sides of the tooth of the first member comprise first and second involute gear surfaces.

5. The latch system of claim 4, wherein:
the first and second teeth of the input lever include involute gear surfaces on opposite sides of the second gap that engage the opposite sides of the tooth of the first member.

6. The latch system of claim 5, wherein:
the first and second teeth of the intermediate member include involute gear surfaces on opposite sides of the first gap.

7. The latch system of claim 6, wherein:
the second tooth of the input lever includes a planar end surface that engages the first involute gear surface of the tooth of the first member while the involute surface of the second tooth of the intermediate member simultaneously engages the second involute gear surface of the tooth of the first member.

8. The latch system of claim 1, wherein:
the input lever is rotatably connected to the support for rotation about a central portion of the input lever, the input lever including a first portion extending from the central portion and wherein the first and second teeth of the input lever are disposed at an end of the first portion.

9. The latch system of claim 8, wherein:
the input lever includes a second portion extending from the central portion and having an end portion, and wherein the first linkage is connected to the end portion.

10. The latch system of claim 1, including:
an input spring rotatably biasing the first tooth of the input lever into engagement with the first tooth of the intermediate member.

11. The latch system of claim 1, wherein:
the first member comprises a wheel that rotates about a center of the wheel, the wheel having oppositely-facing first and second sides and peripheral edge surfaces extending between the first and second sides, the wheel including a protrusion projecting outwardly from the first side, and wherein the tooth projects outwardly from the first side;
the first axis extends through a central portion of the intermediate member, the intermediate member including an arm that extends away from the central portion, the arm including a transverse extension at an end thereof;
the torsion spring including at least one coil extending around the first axis, and a pair of legs extending outwardly away from the first axis, and wherein the protrusion of the wheel and the transverse extension of the intermediate member are disposed between the legs of the torsion spring such that the torsion spring biases the intermediate member to a home position relative to the wheel when the intermediate member rotates in first and second opposite directions relative to the wheel.

12. The latch system of claim 1, wherein:
the latch mechanism includes a rotating claw that is configured to engage a striker to retain a door in a closed position when the claw is in an engaged position;

the pawl engages the claw and retains the claw in the engaged position when the pawl is in a retaining position, and the latch system further including:

a rotatable link operably interconnecting the input lever and the pawl whereby rotation of the input lever rotates the rotatable link and causes rotation of the pawl from the retaining position to the released position such that the claw can rotate from the engaged position and disengage from the striker to permit opening of the door.

13. A door comprising:

a wheel having a wheel tooth and an inertia lever having a first pair of teeth, wherein the wheel tooth is disposed between the first pair of teeth, and wherein the first pair of teeth comprise a first tooth and a second tooth, and the second pair of teeth comprise a first tooth and a second tooth, and wherein the wheel and the inertia lever rotate about a first axis;

a torsion spring biasing the inertia lever to a home position relative to the wheel;

an input lever rotatable to unlatch a latch and having a second pair of teeth that engage the wheel tooth and the first pair of teeth and prevent rotation of the input lever only when the input lever rotates at a rate above a maximum rate, thereby causing rotation of the inertia lever relative to the wheel;

and wherein the first tooth of the input lever engages the first tooth of the inertia lever and rotates the inertia lever relative to the wheel when the input lever rotates at the rate above the maximum rate, and the second tooth of the input lever and the second tooth of the inertia lever engage opposite sides of the wheel to thereby prevent further rotation of the input lever.

14. A latch system for vehicle doors, comprising:

a support;

a first member movably connected to the support, the first member including a tooth having opposite sides;

an intermediate member movably connected to the support, the intermediate member having spaced apart first and second teeth forming a first gap therebetween;

a resilient member operably interconnecting the first member and the intermediate member such that force is transmitted from the intermediate member to the first member through the resilient member and wherein an inertia of the first member causes the resilient member to deform and permit movement of the intermediate member relative to the first member through a first range of motion when the intermediate member is moved at a speed that exceeds a predefined maximum allowable speed;

an input member having spaced apart first and second teeth forming a second gap therebetween;

a movable handle operably connected to the input member by a first linkage such that movement of the handle moves the input member;

a latch mechanism operably connected to the input member such that movement of the input member places the latch mechanism in an unlatched state;

wherein movement of the handle at a first speed causes movement of the input member at a first speed that is below the predefined maximum allowable speed so as to cause the first tooth of the input member to engage the first tooth of the intermediate member and move the intermediate member at a speed below the predefined maximum allowable speed, and the first member to thereby place the latch mechanism in the unlatched state;

movement of the handle at a second speed causes movement of the input member at a second speed that is above the predefined maximum allowable speed and causes the first tooth of the input member to engage the first tooth of the intermediate member and move the intermediate member at the speed that exceeds the predefined maximum allowable speed relative to the first member such that the second tooth of the input member and the second tooth of the intermediate member engage the opposite sides of the tooth of the first member while the first tooth of the input member simultaneously engages the first tooth of the intermediate member, thereby preventing movement of the input member such that the latch mechanism is not placed in the unlatched state.

15. The latch system of claim 14, wherein:

the movable connection of the first member to the support is a rotatable connection;

the movable connection of the intermediate member to the support is a rotatable connection; and the input member is rotatably connected to the support.

16. The latch system of claim 15, wherein:

the resilient member comprises a torsion spring.

17. The latch system of claim 14, wherein:

movement of the input member at the first speed that is below the predefined maximum allowable speed causes the second tooth of the input lever to engage the tooth of the first member such that movement of the input member moves the first member.

* * * * *